United States Patent
Oh

(10) Patent No.: US 11,148,712 B2
(45) Date of Patent: Oct. 19, 2021

(54) REDUCER OF ELECTRIC POWER STEERING APPARATUS

(71) Applicant: MANDO CORPORATION, Pyeongtaek-si (KR)

(72) Inventor: Jin Seok Oh, Suwon-si (KR)

(73) Assignee: Mando Corporation, Pyeongtaek-si (KR)

( * ) Notice: Subject to any disclaimer, the term of this patent is extended or adjusted under 35 U.S.C. 154(b) by 664 days.

(21) Appl. No.: 16/037,409

(22) Filed: Jul. 17, 2018

(65) Prior Publication Data
US 2019/0185054 A1 Jun. 20, 2019

(30) Foreign Application Priority Data
Dec. 19, 2017 (KR) .................. 10-2017-0174887

(51) Int. Cl.
  *B62D 7/22* (2006.01)
  *B62D 5/04* (2006.01)
  *F16F 1/44* (2006.01)

(52) U.S. Cl.
  CPC .......... *B62D 7/224* (2013.01); *B62D 5/0409* (2013.01); *B62D 5/0454* (2013.01); *F16F 1/445* (2013.01)

(58) Field of Classification Search
  CPC .... B62D 7/224; B62D 5/0409; B62D 5/0454; F16F 1/445
  See application file for complete search history.

(56) References Cited

U.S. PATENT DOCUMENTS

| | | | |
|---|---|---|---|
| 2002/0017420 A1* | 2/2002 | Kinme | F16H 57/021 180/444 |
| 2003/0146039 A1* | 8/2003 | Sano | B62D 5/0409 180/444 |
| 2004/0163879 A1* | 8/2004 | Segawa | F16H 57/021 180/444 |
| 2004/0245040 A1* | 12/2004 | Eda | F16H 1/16 180/444 |
| 2005/0224278 A1* | 10/2005 | Segawa | F16H 57/021 180/444 |

(Continued)

FOREIGN PATENT DOCUMENTS

| KR | 10-2010-0032775 A | 3/2010 |
|---|---|---|
| KR | 10-1121839 B1 | 3/2012 |

OTHER PUBLICATIONS

Office Action issued in corresponding Korean Application No. 10-2017-0174887, dated Feb. 7, 2019.

*Primary Examiner* — Minnah L Seoh
*Assistant Examiner* — Conan D Duda
(74) *Attorney, Agent, or Firm* — Morgan, Lewis & Bockius LLP

(57) ABSTRACT

The present disclosure relates to a reducer of an electric power steering apparatus. The present embodiments provide a reducer of an electric power steering apparatus, comprising: a first bearing configured to be coupled to one end of the worm shaft on one side where a motor shaft is connected, among both ends of the worm shaft; a second bearing configured to be coupled to the opposite end of the worm shaft; a plug bolt configured to have a seating groove formed on a support surface for axially supporting the first bearing and configured to have an outer circumferential surface coupled to a gear housing; and a damper configured to support an end of the first bearing and configured to be coupled to the seating groove of the plug bolt.

10 Claims, 11 Drawing Sheets

(56) References Cited

U.S. PATENT DOCUMENTS

| | | | |
|---|---|---|---|
| 2010/0320026 A1* | 12/2010 | Yoshida | H02K 7/1166 180/444 |
| 2011/0147113 A1* | 6/2011 | Ko | B62D 3/04 180/444 |
| 2012/0111657 A1* | 5/2012 | Hamakita | F16C 27/066 180/444 |
| 2013/0239726 A1* | 9/2013 | Fuechsel | F16H 1/16 74/425 |
| 2014/0008142 A1* | 1/2014 | Yoshikawa | B62D 5/0454 180/444 |
| 2014/0027197 A1* | 1/2014 | Kikuchi | B62D 5/0454 180/444 |
| 2014/0182401 A1* | 7/2014 | Ishii | B62D 5/0409 74/89.14 |
| 2014/0352468 A1* | 12/2014 | Kim | F16H 57/12 74/409 |
| 2015/0027248 A1* | 1/2015 | Yamada | B62D 5/04 74/89.14 |
| 2015/0075899 A1* | 3/2015 | Kikuchi | F16C 35/077 180/444 |
| 2015/0217804 A1* | 8/2015 | Moriyama | F16F 15/1245 180/444 |
| 2016/0318545 A1* | 11/2016 | Uchihara | B62D 3/04 |
| 2016/0332659 A1* | 11/2016 | Hong | F16D 3/00 |
| 2018/0003268 A1* | 1/2018 | Song | F16H 1/225 |
| 2018/0080502 A1* | 3/2018 | Oosawa | F16H 1/16 |
| 2018/0172134 A1* | 6/2018 | Segawa | F16H 1/16 |
| 2018/0216719 A1* | 8/2018 | Kim | F16H 57/028 |
| 2018/0304915 A1* | 10/2018 | Kawamura | F16H 1/16 |
| 2019/0031228 A1* | 1/2019 | Shimoda | F16H 1/16 |
| 2019/0234505 A1* | 8/2019 | Ishii | F16H 1/16 |
| 2020/0180677 A1* | 6/2020 | Hafermalz | F16C 23/06 |
| 2020/0217411 A1* | 7/2020 | Appleyard | F16H 57/028 |
| 2020/0290666 A1* | 9/2020 | Oosawa | F16D 3/54 |

* cited by examiner

REDUCER OF ELECTRIC POWER STEERING APPARATUS

CROSS REFERENCE TO RELATED APPLICATION

This application claims priority from Korean Patent Application No. 10-2017-0174887, filed on Dec. 19, 2017, which is hereby incorporated by reference for all purposes as if fully set forth herein.

BACKGROUND OF THE INVENTION

1. Field of the Invention

The present embodiments relate to a reducer of an electric power steering apparatus. More particularly, the present embodiments relate to a reducer of an electric power steering apparatus capable of reducing the rattling noise caused by an increase in the backlash from wear of a worm and a worm wheel or caused by an impact transmitted from the road surface through wheels and a steering shaft, allowing a worm shaft to move in the axial and radial directions, and reducing locking and rotating resistance between the worm shaft and a bearing, thereby facilitating a driver's steering operation.

2. Description of the Prior Art

In general, a reducer of an electric power steering apparatus controls the driving of a motor provided in a reducer by means of an electronic control device provided in a vehicle depending on the vehicle driving condition so that the rotational force of the worm shaft according to the driving of the motor is transmitted to the steering shaft through the worm wheel in addition to the rotational force of the steering wheel operated by the driver, thereby maintaining a smooth and stable steering operation state for the driver.

However, a conventional reducer of an electric power steering apparatus has problems in that manufacturing errors and assembly errors are accumulated at a joint portion between the worm shaft and the motor shaft, which may cause the bearing to be caught and the rotational resistance of the worm shaft to increase.

In addition, a gap is created between the worm and the worm wheel due to abrasion as they are used, so that rattling noise is generated due to the backlash. Further, rattling noise is also generated by an impact transmitted from the road surface through the wheels and the steering shaft, which causes inconvenience to the driver when operating the steering wheel.

SUMMARY OF THE INVENTION

The present embodiments have been made based on the above-mentioned background, and an aspect thereof is to reduce the rattling noise generated by an increase in the backlash by abrasion between the worm and the worm wheel or generated by an impact transmitted from the road surface through wheels and the steering shaft, to allow the worm shaft to move in the axial and radial directions, and to reduce locking and rotating resistance between the worm shaft and the bearing, thereby facilitating a driver's steering operation.

Further, the aspect of the present disclosure is not limited thereto, and other unmentioned aspects of the present disclosure may be clearly appreciated by those skilled in the art from the following descriptions.

In accordance with an aspect of the present embodiments, there is provided a reducer of an electric power steering apparatus including: a first bearing configured to be coupled to one end of the worm shaft on one side where a motor shaft is connected, among both ends of the worm shaft; a second bearing configured to be coupled to the opposite end of the worm shaft; a plug bolt configured to have a seating groove formed on a support surface for axially supporting the first bearing and configured to have an outer circumferential surface coupled to a gear housing; and a damper configured to support an end of the first bearing and configured to be coupled to the seating groove of the plug bolt.

According to the present embodiments having the above-mentioned shapes and structures, it is possible to reduce the rattling noise generated by an increase in the backlash by abrasion between the worm and the worm wheel or generated by an impact transmitted from the road surface through wheels and the steering shaft, to allow the worm shaft to move in the axial and radial directions, and to reduce locking and rotating resistance between the worm shaft and the bearing, thereby facilitating driver's steering operation.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
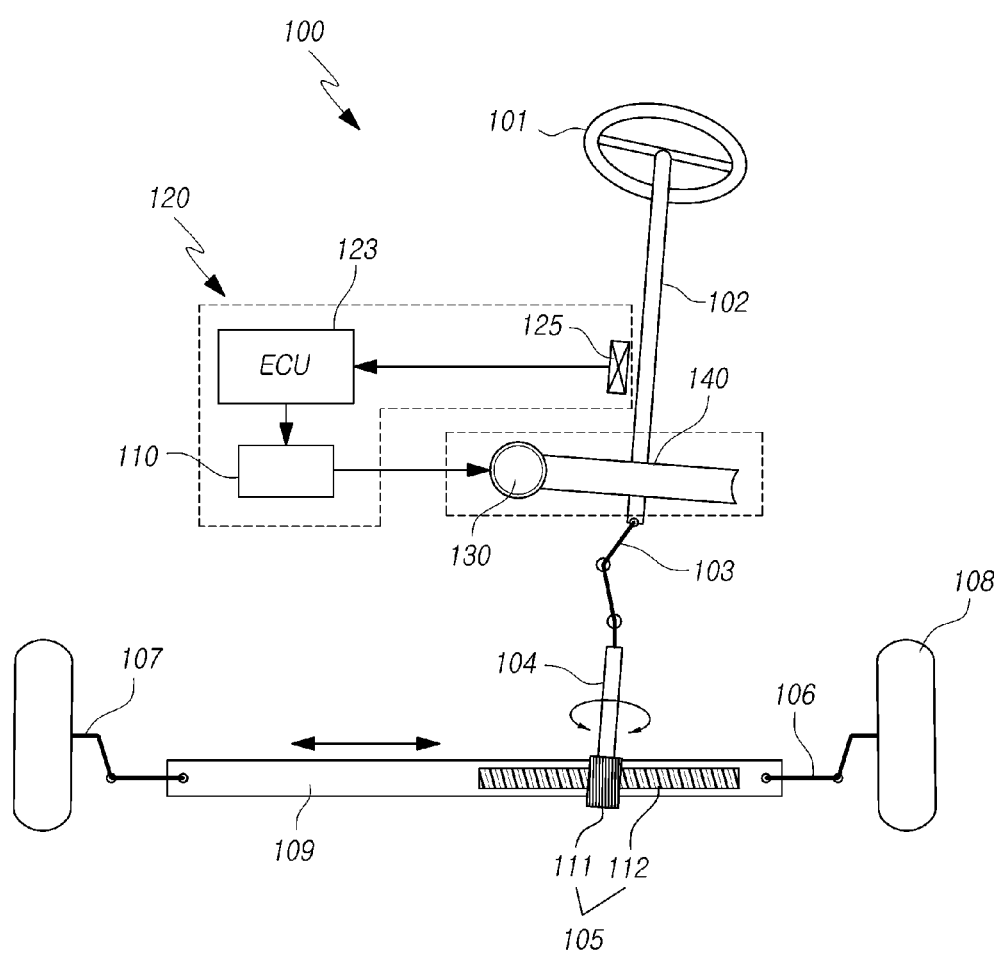
FIG. 1 is a configuration diagram schematically illustrating a reducer of an electric power steering apparatus according to the present embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. It should be noted that when it is described in the specification that one component is "connected," "coupled" or "joined" to another component, a third component may be "connected," "coupled," and "joined" between the first and second components, although the first component may be directly connected, coupled or joined to the second component.

Figure 2:
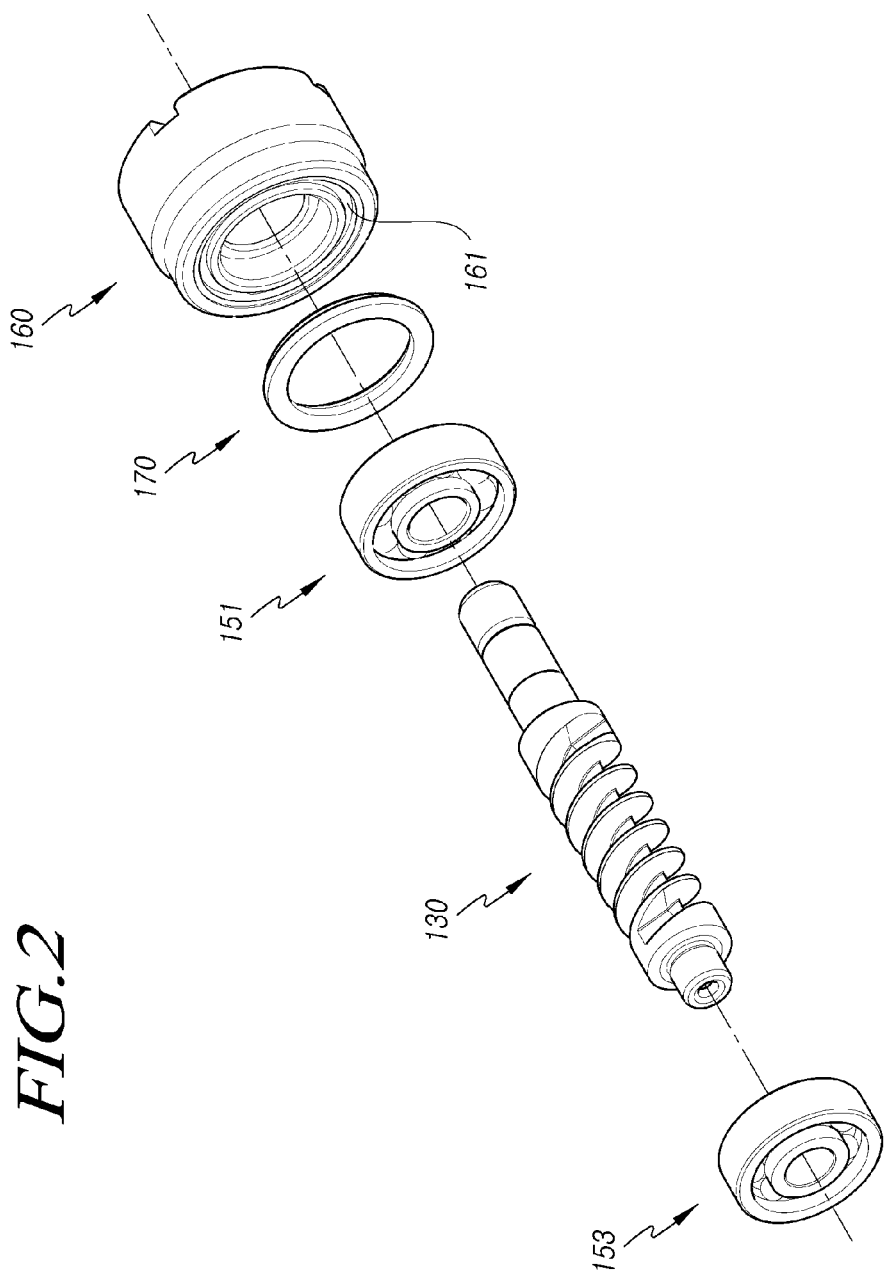
FIG. 2 is an exploded perspective view illustrating a part of a reducer of an electric power steering apparatus according to the present embodiments.
Figure 3:
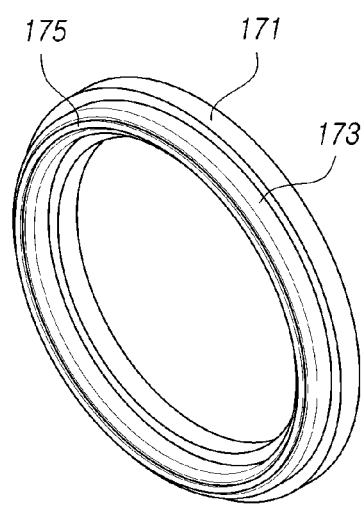
FIG. 3 is a perspective view illustrating a part of a reducer of an electric power steering apparatus according to the present embodiments.

FIG. 1 is a configuration diagram schematically illustrating a reducer of an electric power steering apparatus according to the present embodiments. FIG. 2 is an exploded perspective view illustrating a part of a reducer of an electric power steering apparatus according to the present embodiments. FIG. 3 is a perspective view illustrating a part of a reducer of an electric power steering apparatus according to the present embodiments. FIGS. 4 to 11 are cross-sectional views illustrating a part of a reducer of an electric power steering apparatus according to the present embodiments.

As shown in the drawings, a reducer of an electric power steering apparatus 100, according to the present embodiments, may include a first bearing 151 coupled to one end of a worm shaft 130 on the side where a motor shaft 1 is connected, among both ends of the worm shaft 130, a second bearing 153 coupled to the opposite end of the worm shaft 130, a plug bolt 160 having a seating groove 161 formed on a support surface 163 for axially supporting the first bearing 151 and having an outer circumferential surface coupled to a gear housing 180, and a damper 170 supporting an end of the first bearing 151 and coupled to the seating groove 161 of the plug bolt 160.

The electric power steering apparatus 100 is configured to include a steering wheel 101 disposed in a driver's seat, a steering shaft 102 coupled to the steering wheel, a rack-pinion mechanism 105 including a pinion gear 111 and a rack gear 112 that convert rotational force received from the steering shaft 102 into a linear motion, and a rack bar 109 having tie rods 106 and knuckle arms 107 at respective ends thereof.

The steering shaft 102 is coupled to the steering wheel 101 at one end thereof while rotating along with the steering wheel 101, and the opposite end of the steering shaft 102 is connected to a pinion shaft 104 via a pair of universal joints 103. The pinion shaft 104 is connected to the rack bar 109 via the rack-pinion mechanism 105, and both ends of the rack bar 109 are connected to the wheels 108 of the vehicle via the tie rods 106 and the knuckle arms 107.

An auxiliary power mechanism 120 is configured to include a torque sensor 125 for sensing a torque applied to the steering wheel 101 by a driver to thus output an electric signal proportional to the sensed torque, an electronic control unit (ECU) 123 for generating a control signal based on an electric signal transmitted from the torque sensor 125, a motor 110 for generating auxiliary power based on a control signal transmitted from the electronic control unit 123, and a reducer including a worm shaft 130 and a worm wheel 140 for transmitting the auxiliary power generated by the motor 110 to the steering shaft 102.

Accordingly, the electric power steering apparatus is configured such that torque generated by the rotation of the steering wheel 101 is transmitted to the rack bar 109 via the rack-pinion mechanism 105, and such that an auxiliary power generated by the motor 110 depending on the generated torque is transmitted to the rack bar 109.

That is, the torque generated by the rotation of the steering wheel 101 and the auxiliary power generated by the motor 110 are combined to move the rack bar 109 in the axial direction.

The reducer supports the steering force of the driver by rotating the steering shaft 102 while the worm shaft 130 and the worm wheel 140 interwork with each other by the driving force of the motor 110. The first bearing 151 and the second bearing 153 are coupled to ends of the worm shaft 130 respectively, which interworks with the motor shaft 1 when the motor 110 is driven, thereby supporting the rotation of the worm shaft 130. The worm wheel 140 and the worm shaft 130, which interwork with the steering shaft 102, are provided inside a gear housing 180.

The first bearing 151 is coupled to one end of the worm shaft 130, among both ends thereof, at the side where the motor shaft 1 is connected, and the second bearing 153 is coupled to the opposite end of the worm shaft 130.

The first bearing 151 and the second bearing 153 are mounted inside the gear housing 180 and support the rotation of the worm shaft 130 at both ends of the worm shaft 130, thereby reducing the rotational resistance of the worm shaft 130. However, the locking amount of the bearings tends to increase due to accumulation of manufacturing errors and assembly errors at a coupling portion of the worm shaft 130 and the motor shaft 1, which is a coupling portion between shafts via the plug bolt 160, thereby increasing the rotational resistance of the worm shaft 130.

In addition, when the external force is transmitted to the worm wheel 140 from the road surface through the wheels and the steering shaft 102, the worm shaft 130, which is engaged with the worm wheel 140, exhibits elastic deformation such that the worm shaft 130 warps, as well as in the axial direction, at a predetermined angle with respect to the axial direction.

Therefore, the damper 170 and the plug bolt 160 are coupled to the end of the worm shaft 130 at a portion connected to the motor shaft 1, among both ends thereof, in order to absorb vibration and noise generated due to the elastic deformation in which the worm shaft 130 warps in the axial direction or at a predetermined angle with respect to the axial direction by the external force transmitted via the worm wheel 140 and by the operation of the worm shaft 130 and the worm wheel 140.

The plug bolt 160 has a seating groove 161 formed on a support surface 163 for axially supporting the first bearing 151 and has a large diameter portion 165 having threads formed on the outer circumferential surface thereof so as to be engaged with threads formed on the inner circumferential surface of the gear housing 180.

The damper 170 is interposed between the first bearing 151 and the plug bolt 160 such that one side of the damper 170 supports the end of the first bearing 151 and the opposite side of the damper 170 is connected to the seating groove 161 of the plug bolt 160, thereby providing the first bearing 151 with elastic force in the axial and radial directions.

The damper 170 includes a first support portion 171 for supporting the outer wheel 151a of the first bearing 151 in the axial direction and a second support portion 173 that extends in the axial direction from an end of the first support portion 171 so as to be inserted into the seating groove 161 of the plug bolt 160.

Figure 5:
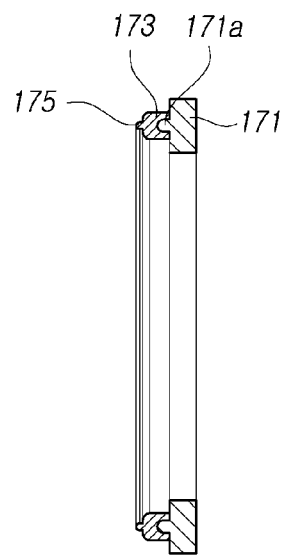

As shown in FIG. 5, the first support portion may include a protrusion 171a protruding so as to be inserted into and supported by the second support portion 173, and the protrusion 171a may increase elastic support force when the second support portion 173 is elastically deformed.

Figure 4:
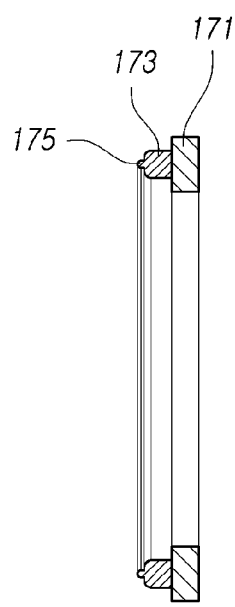
FIGS. 4 to 11 are cross-sectional views illustrating a part of a reducer of an electric power steering apparatus according to the present embodiments.

As shown in FIGS. 4 and 5, the thickness of the second support portion 173 may be uniform in the radial direction. However, as shown in FIG. 6, the second support portion 173 may have a thickness that increases in the radial direction as it goes from the end of the second support portion 173 to the first support portion 171.

Figure 6:
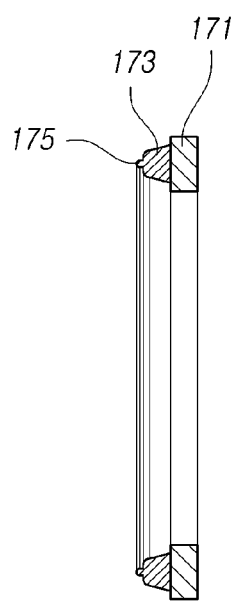

That is, in the case where the thickness of the second support portion 173 increases as it goes toward the first support portion 171 as shown in FIG. 6, the load applied in the axial direction increases during the elastic deformation of the second support portion 173, thereby increasing elastic support force and, particularly, increasing support force for damping when an impact load is reversely transmitted.

The damper 170 further includes a support protrusion 175 protruding in the axial direction from the end of the second support portion 173 so that the support protrusion 175 is inserted into the seating groove 161 of the plug bolt 160 while being elastically compressed and coupled thereto.

Therefore, when vibration and load are transmitted to the worm shaft 130, the support protrusion 175 is elastically deformed to primarily absorb the same, and when a large impact load is transmitted from the road surface, the second support portion 173 is elastically deformed to secondarily absorb the load.

That is, when a small load is transmitted, the load is supported by the elastic force of the support protrusion 175, and when a large load is instantaneously transmitted, the support protrusion 175 and the second support portion 173 simultaneously support the large load to absorb the vibration and the load, thereby preventing the rattling noise of the reducer.

Figure 7:
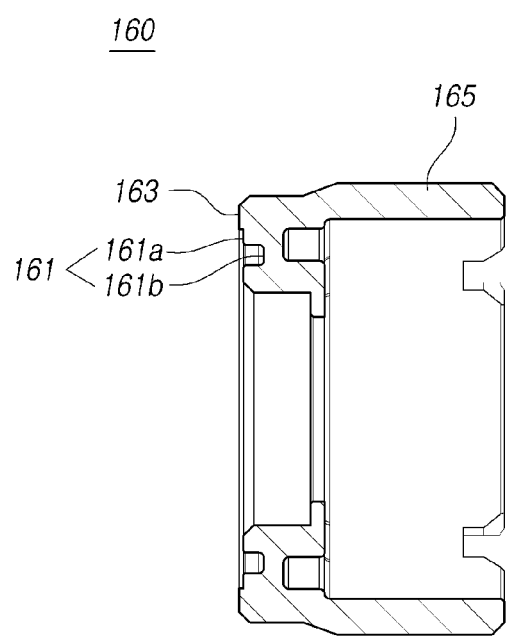

As shown in FIG. 7, the seating groove 161 has a first seating groove 161a in which the end of the first support portion 171 is seated and a second seating groove 161b into which the second support portion 173 and the support protrusion 175 are inserted, so that the first support portion 171 of the damper 170 is maintained at a fixed position without being detached from the first seating groove 161a, and so that the second support portion 173 and the support protrusion 175 are elastically deformed in the inner space of the second seating groove 161b.

Figure 8:
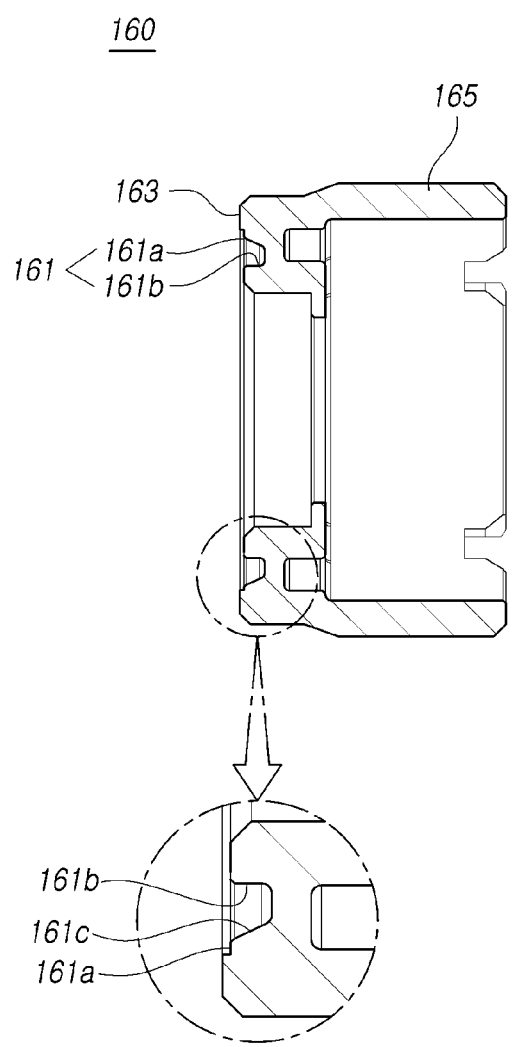

As shown in FIG. 8, the second seating groove 161b may have a tapered portion 161c in which the width in the radial direction increases as it goes from the inner end of the second seating groove 161b to the first seating groove 161a.

That is, the tapered portion 161c is provided such that the width thereof increases as it goes to the opening of the second seating groove 161b, and the tapered portion 161c may be formed on the inner side or the outer side in the radial direction. FIG. 8 shows an example in which the tapered portion 161c is formed on the outer side in the radial direction.

Therefore, as the load applied in the axial direction increases when the worm shaft 130 moves in the axial direction, the insertion depth of the second support portion 173 of the damper 170 into the second seating groove 161b increases, thereby increasing elastic support force gradually and, particularly, increasing support force for damping when an impact load is reversely transmitted.

Figure 10:
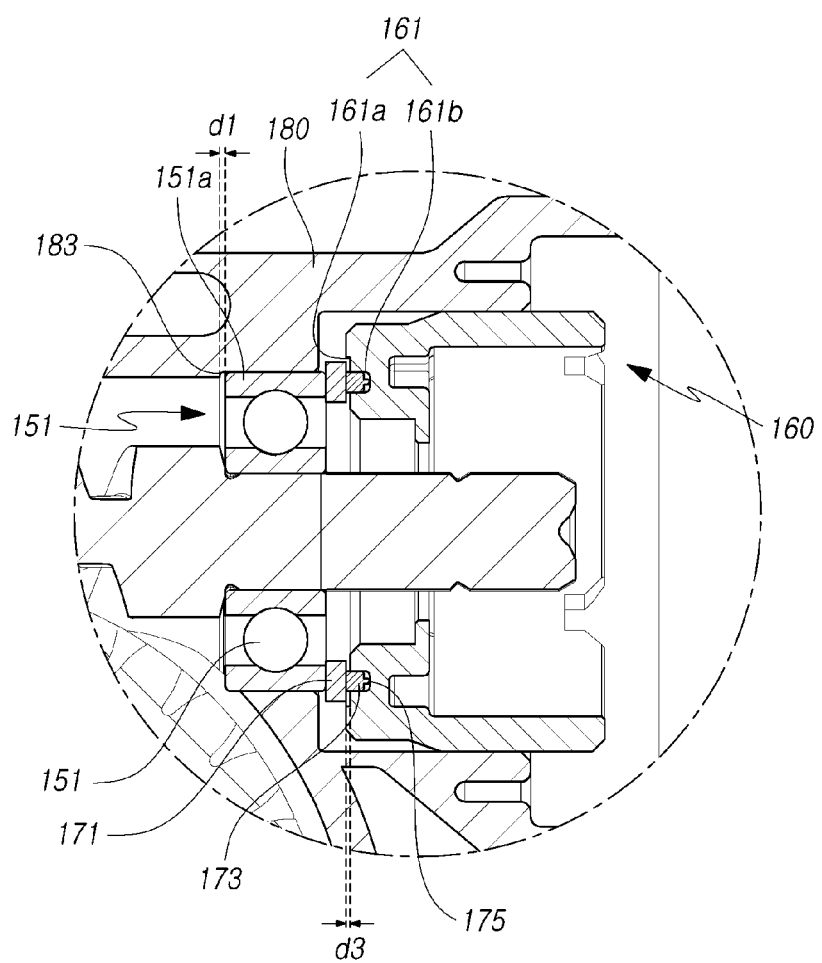
Figure 11:
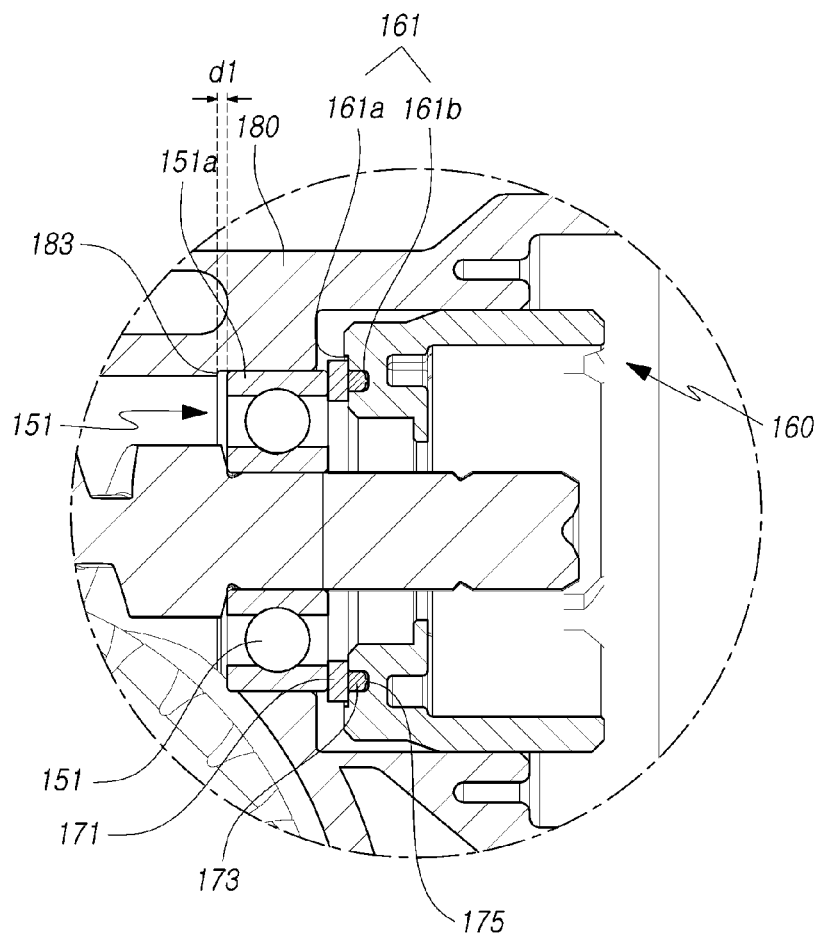

As shown in FIG. 10, since the damper 170 is assembled such that a gap (d3) of 0.3 mm to 1 mm is provided between the first support portion 171 and the first seating groove 161a, the first support portion 171 is supported by the first seating groove 161a and is elastically deformed as shown in FIG. 11 showing the state in which a predetermined movement of the worm shaft 130 has been performed in the axial direction.

The damper 170 is provided at a position spaced apart from the inner circumferential surface of the gear housing 180 in the axial and radial directions. Thus, even if the worm shaft 130 is elastically deformed and twisted at a predetermined angle with respect to the axial direction, the damper 170 can be supported without interference with the gear housing 180.

As shown in FIGS. 10 and 11, the gear housing 180 is provided with a first step portion 183 on the inner surface at the side where the motor shaft is connected. Since the outer wheel 151a of the first bearing 151 is coupled so as to have a gap (d1) with respect to the first step portion 183 of the gear housing 180 in the axial direction, the worm shaft 130 can move in the axial direction by the axial damping amount of the damper 170.

Figure 9:
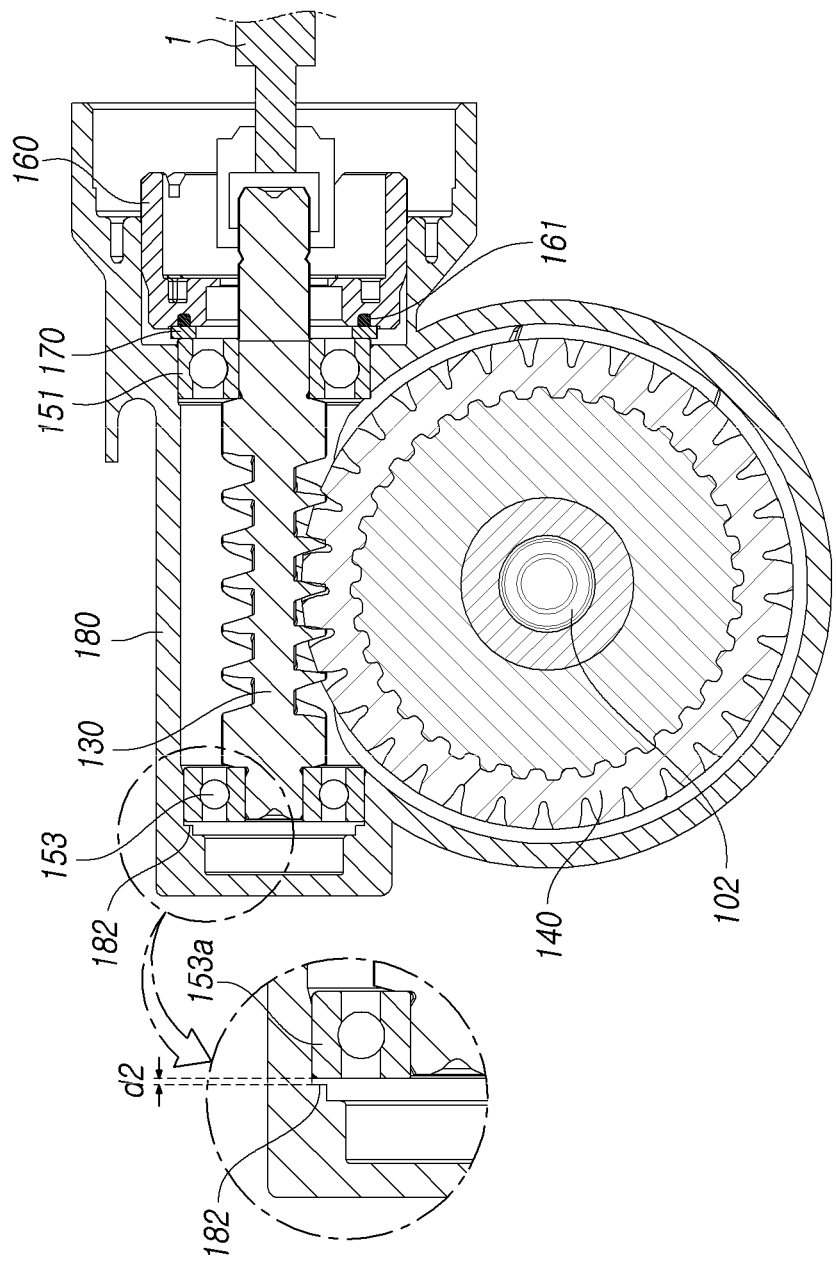

As shown in FIG. 9, the gear housing 180 is provided with a second step portion 182 on the inner surface at the side opposite the side where the motor shaft is connected. Since a gap (d2) is provided in the axial direction between the outer wheel 153a of the second bearing 153 coupled to the opposite end of the worm shaft 130 and the second step portion 182 of the gear housing 180, the worm shaft can move in the axial direction by the axial damping amount of the damper.

The first bearing 151 and the second bearing 153 are fitted to the worm shaft 130 and are slidably engaged with the gear housing 180. Accordingly, the worm shaft 130 can be elastically deformed at a predetermined angle with respect to the axial direction at a position of the first bearing 151 on the basis of the second bearing 153.

Therefore, the end of the worm shaft 130 to which the second bearing 153 is coupled may move in the axial direction along the gear housing 180, and the opposite end thereof to which the first bearing 151 is coupled may move in the axial and radial directions, wherein the damper 170 may absorb the axial and radial movement.

The first support portion 171 of the damper 170 may be made of at least one of plastic materials, such as polyacetal (POM), polyamide (PA), polycarbonate (PC), polyimide (PI), polybutylene terephthalate (PBT), polyethylene terephthalate (PET), and the like, in order to provide rigidity for fixing the position of the damper 170 in the first seating groove 161a and in order to absorb the load and the vibration.

The second support portion 173 and the support protrusion 175 may be made of at least one of elastic materials, such as NR (Natural Rubber), BR (Butadiene Rubber), NBR (Nitrile Butadiene Rubber), CR (Chloroprene Rubber), EPDM (Ethylene Propylene Diene Monomer Rubber), SBR (Styrene Butadiene Rubber), CSM (Chlorosulphonated Polyethylene), fluorine rubber, silicone, urethane, thermoplastic polyurethane (TPU), and the like, in order to facilitate elastic compression in the axial and radial directions.

According to the present embodiments having the above-mentioned shapes and structures, it is possible to reduce the rattling noise generated by an increase in the backlash by abrasion between the worm and the worm wheel or generated by an impact transmitted from the road surface through wheels and the steering shaft, to allow the worm shaft to move in the axial direction and in the radial direction, and to reduce locking and rotating resistance between the worm shaft and the bearing, thereby facilitating driver's steering operation.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A reducer of an electric power steering apparatus, comprising:
    a first bearing configured to be coupled to one end of a worm shaft on one side where a motor shaft is connected, among both ends of the worm shaft;
    a second bearing configured to be coupled to the opposite end of the worm shaft;
    a plug bolt having a seating groove on a support surface for axially supporting the first bearing, the plug bolt having an outer circumferential surface coupled to a gear housing; and
    a damper configured to support an end of the first bearing and configured to be coupled to the seating groove of the plug bolt,
    wherein the damper includes:
        a first support portion for supporting an outer wheel of the first bearing and having a protrusion protruding so as to extend through and supported by the second support portion;
        a second support portion extending in an axial direction from an end of the first support portion so as to be inserted into the seating groove; and
        a support protrusion protruding from an end of the second support portion in the axial direction.

2. The reducer of claim 1, wherein the second support portion has a radial thickness increasing from an end of the second support portion to the first support portion.

3. The reducer of claim 1, wherein the seating groove has:
    a first seating groove in which an end of the first support portion is seated; and
    a second seating groove into which the second support portion and the support protrusion extend.

4. The reducer of claim 3, wherein the second seating groove has a tapered portion in which the width in a radial direction increases from an inner end of the second seating groove to the first seating groove.

5. The reducer of claim 3, wherein the first support portion and the first seating groove are spaced apart from each other by a gap of 0.3 mm to 1 mm in the state in which the damper is assembled.

6. The reducer of claim 1, wherein the damper is disposed at a position spaced from an inner circumferential surface of the gear housing in the axial and radial directions.

7. The reducer of claim 1, wherein the gear housing has a first step portion on an inner surface of the gear housing near the one end of the worm shaft, and
    wherein the outer wheel of the first bearing and the first step portion are spaced apart from each other in the axial direction.

8. The reducer of claim 7, wherein the gear housing has a second step portion provided on an inner surface of the gear housing near the opposite end of the worm shaft, and
    wherein the outer wheel of the second bearing and the second step portion are spaced apart from each other in the axial direction.

9. The reducer of claim 1, wherein the first support portion includes at least one material selected from the group consisting of polyacetal (POM), polyamide (PA), polycarbonate (PC), polyimide (PI), polybutylene terephthalate (PBT), and polyethylene terephthalate (PET).

10. The reducer of claim 1, wherein the second support portion and the support protrusion include at least one material selected from the group consisting of NR (Natural Rubber), BR (Butadiene Rubber), NBR (Nitrile Butadiene Rubber), CR (Chloroprene Rubber), EPDM (Ethylene Propylene Diene Monomer Rubber), SBR (Styrene Butadine Rubber), CSM (Chlorosulphonated Polyethylene), fluorine rubber, silicone, urethane, and thermoplastic polyurethane (TPU).

* * * * *